United States Patent [19]

Ledebuhr

[11] Patent Number: 4,786,146
[45] Date of Patent: Nov. 22, 1988

[54] COLOR SEQUENTIAL ILLUMINATION SYSTEM FOR A LIQUID CRYSTAL LIGHT VALVE

[75] Inventor: Arno G. Ledebuhr, Pleasanton, Calif.

[73] Assignee: Hughes Aircraft Company, Los Angeles, Calif.

[21] Appl. No.: 13,307

[22] Filed: Feb. 11, 1987

[51] Int. Cl.⁴ .................. G02F 1/13; G02B 27/14; G03B 21/14

[52] U.S. Cl. ................. 350/331 R; 350/173; 350/337; 350/339 F; 353/20

[58] Field of Search .............. 350/337, 331 R, 342, 350/339 F, 401, 402, 404, 408, 387–389, 173, 174; 353/31, 33, 37, 20; 358/225, 226, 232, 237

[56] References Cited

U.S. PATENT DOCUMENTS

| | | | |
|---|---|---|---|
| 1,619,468 | 4/1924 | Gruender | 350/174 X |
| 3,336,835 | 8/1967 | Everensen et al. | 350/174 X |
| 3,520,593 | 6/1968 | McNaney | 350/388 X |
| 3,708,797 | 1/1973 | Solomon et al. | 350/388 |
| 3,746,879 | 7/1973 | Esaki et al. | 350/389 |
| 4,127,322 | 11/1978 | Jacobson et al. | 353/31 |
| 4,417,253 | 11/1983 | Jacks | 350/173 |
| 4,464,018 | 8/1984 | Gagnon | 350/342 X |
| 4,583,825 | 4/1986 | Buzak | 350/337 |
| 4,595,260 | 7/1986 | Kubota | 353/31 X |
| 4,685,773 | 8/1987 | Carlsen et al. | 350/401 |

FOREIGN PATENT DOCUMENTS 0360633 10/1970 U.S.S.R. .............................. 350/403

OTHER PUBLICATIONS

Bennet et al "Eavesdrop-Detecting Quantum Communications Channel" IBM Technical Disclosure vol. 26, No. 8, Jan. 1984.

*Primary Examiner*—Stanley D. Miller
*Assistant Examiner*—David Lewis
*Attorney, Agent, or Firm*—A. W. Karambelas

[57] ABSTRACT

A color sequential illumination system for a liquid crystal light valve is disclosed. The invention operates with no moving parts and provides for the sequential illumination of a light valve with at least two beams of different colors. The rate is fast enough that the colors fuse together and the viewer sees a composite color image. The system includes a prepolarizer and dichroics for providing a first beam along a first optical path having a first color and a first polarization state and a second beam along a second optical path having a second color and said first polarization state. An optical switch is provided for selectively transmitting the first and second beams by sequentially changing the polarization state of each. Associated optical components are provided for directing the first and second beams onto the liquid crystal light valve.

20 Claims, 2 Drawing Sheets

COLOR SEQUENTIAL ILLUMINATION SYSTEM FOR A LIQUID CRYSTAL LIGHT VALVE

BACKGROUND OF THE INVENTION

1. Field of the Invention:

The present invention relates to image projection systems. More specifically, the present invention relates to liquid crystal light valve image projection systems.

While the invention is described herein with reference to an illustrative embodiment for a particular application, the invention is not limited thereto. Those of ordinary skill in the art and access to the teachings provided herein will recognize additional modifications, applications and embodiments within the scope of the invention.

2. Description of the Related Art:

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in accordance with the information incident on the photoconductor. Therefore, when a complex distribution of light, for example, a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 disclosed such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display* (SID), International Symposium, Digest of Technical Papers, May 1979, pp. 22–23.

More sophisticated liquid crystal light valve image projection systems are illustrated in the following patents: U.S. Pat. Nos. 4,425,028, issued to R. J. Gagnon et al on Jan. 10, 1984; 4,544,237, issued to R. J. Gagnon on Oct. 1, 1985; 4,461,542, to R. J. Gagnon on July 24, 1984; and 4,464,019, issued to R. J. Gagnon on Aug. 7, 1984.

While these designs provide high resolution, high contrast color images, a need remains in the art for a more simple and inexpensive design affording greater ease of alignment.

SUMMARY OF THE INVENTION

The need illustrated by the related art is addressed by the color sequential illumination system of the present invention. The invention operates with no moving parts and provides for the sequential illumination of a light valve with at least two beams of different colors. The rate is fast enough that the colors fuse together and the viewer sees a composite color image. The system includes a prepolarizer and dichroics for providing a first beam along a first optical path having a first color and a first polarization state and a second beam along a second optical path having a second color and said first polarization state. An optical switch is provided for selectively transmitting the first and second beams by changing the polarization state of each. Associated optical components are provided for directing the first and second beams onto the liquid crystal light valve. In specific embodiments, a second optical switch is provided and a control system is included for controlling the sequential activation thereof. In other embodiments, the dichroics are provided after the optical switch.

DESCRIPTION OF THE INVENTION

The present invention provides a simple, inexpensive alternative to conventional full color liquid crystal light valve image projection systems, which is also easy to align and maintain. The invention operates with no moving parts and provides for the sequential illumination of a light valve with multiple beams of different colors. The rate is fast enough that the colors fuse together and the viewer sees a composite full color image.

Figure 1:
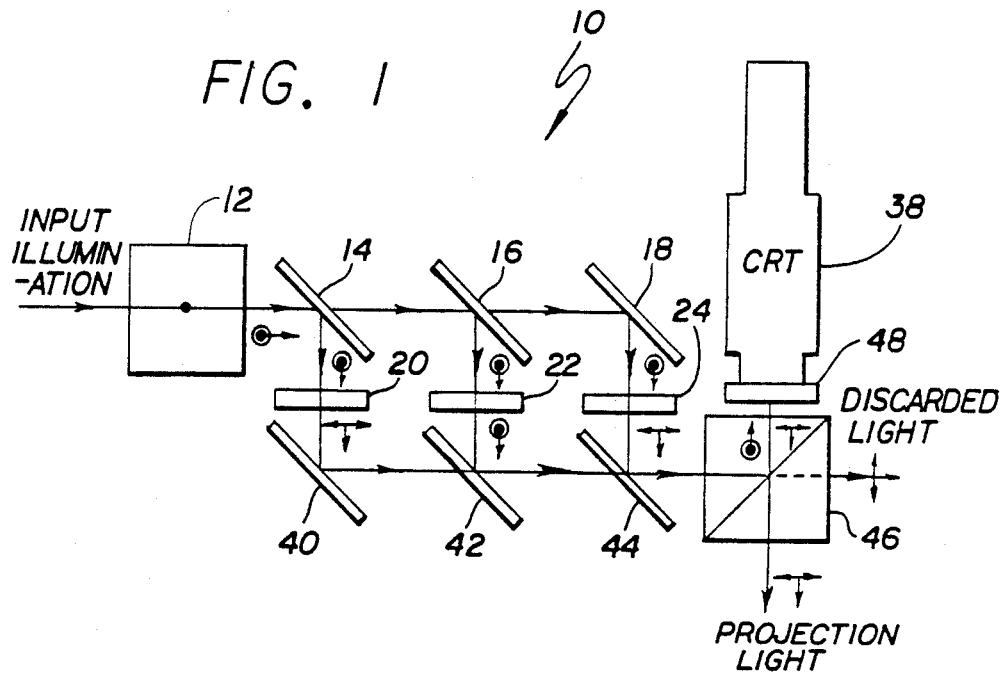
FIG. 1 is an optical layout of an illustrative embodiment of a color sequential illumination system utilizing the teachings of the present invention.

FIG. 1 shows an illustrative optical layout 10 incorporating the teachings of the present invention. Input illumination, provided by a source (not shown), having S and P polarization states, is prepolarized by a conventional MacNeille wide band polarizing prism 12. As is known in the art, other prepolarizers may be used in the embodiment of FIG. 1, so long as the prepolarizer has high S reflectance and low P reflectance. The prepolarizer filter element 13 is arranged at 45 degrees with respect to the incident illumination. It transmits the P component and reflects the S component 90 degrees off the plane of the paper; that is, out of the page. The P component transmitted by the prepolarizer 12 becomes S polarized with respect to the elements following the prepolarizer 12 in the optical train. This is due to the fact that the prepolarizer 12 is rotated 90 degrees with respect to the subsequent beamsplitters in the optical train. A blue filter 14 receives the white S light, reflects the blue wavelength and transmits the red and green wavelengths. A second filter 16 reflects the red wavelengths and transmits the green wavelengths. A third filter 18 reflects the green wavelengths. The filters 14, 16, and 18 are oriented at 45 degrees with respect to the incident light. Filter designs exist for 45 degree blue and red reflecting filters that transmit the remaining visible wavelengths. The 45 degree green reflecting filter is similarly available off-the-shelf. Those of ordinary skill in the art will recognize that the third filter 18 may be replaced with a broadband reflector without departing from the scope of the invention.

Figure 2:
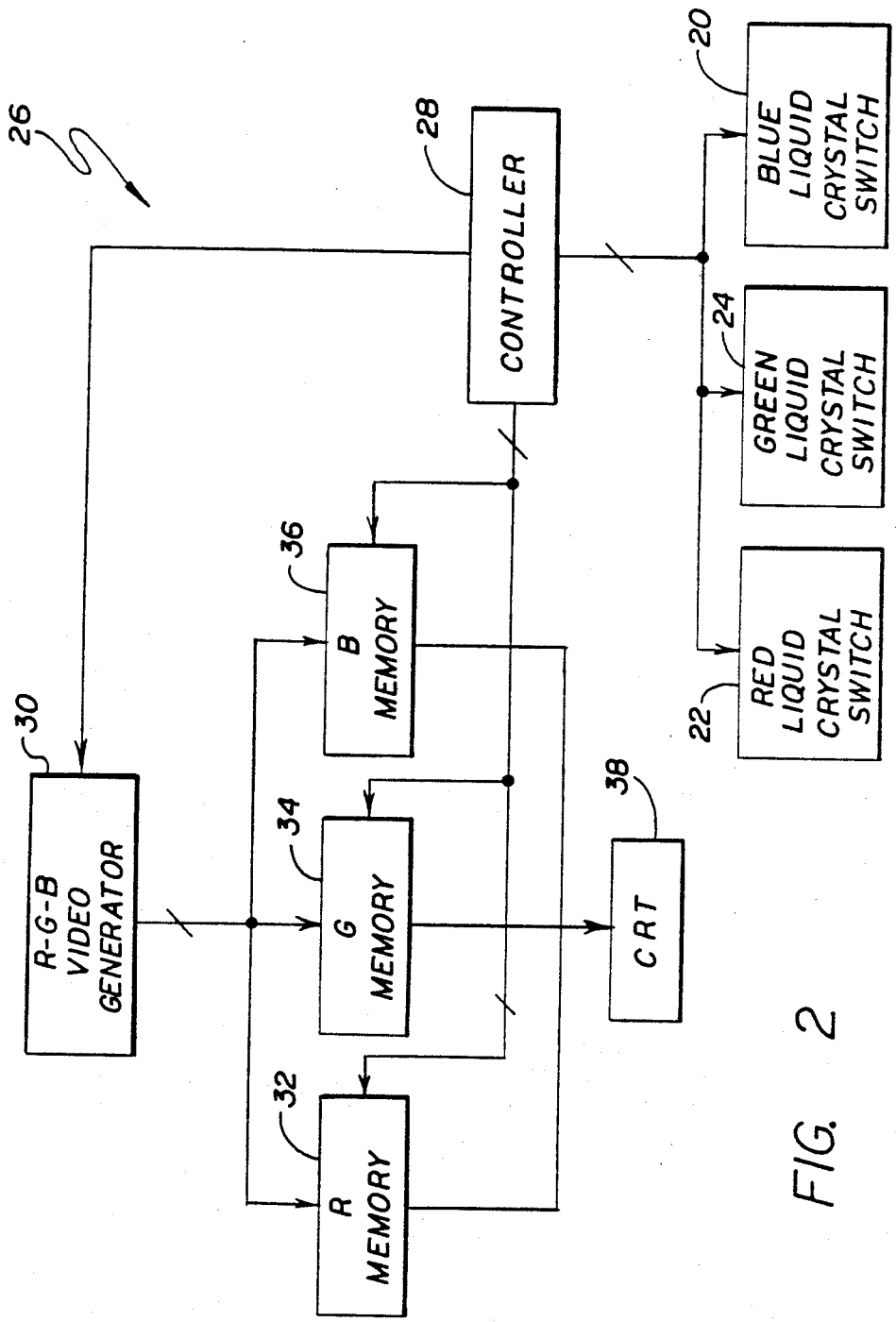
FIG. 2 is a block diagram showing an illustrative implementation of a control subsystem for a color sequential illumination system utilizing the teachings of the present invention.

The 45 degree orientation of the filters 14, 16 and 18 is effective to reflect the blue, red and green primary colors to first, second, and third liquid crystal polarization switches 20, 22, and 24 respectively. That is, the first optical switch 20 receives S polarized blue light, the second switch 22 receives S polarized red light, and the third switch 24 receives S polarized green light. Each switch acts as a shutter switching the transmitted polarization state for each of the primary colors independently. The switches are designed and manufactured by the Tektronix Corporation to act as half wave retarders in the 'off' state and can be arranged to rotate the incident linearly polarized light by 90 degrees. In the 'on' state, no birefringence effects take place and incident and transmitted polarizations are the same. The switches are liquid crystal pi-cells or shutters manufactured by Tektronix Corporation either without absorbing polarizers, or with the absorbing polarizers removed. The switches are sequentially switched off and on by a control system 26 which is typified by the block diagram of FIG. 2. The controller 28, which would include a suitably programmed microprocessor, would trigger an standard RGB video generator 30 to dump the red video signals into a first memory 32, the green video into a second memory 34 and the blue video into a third memory 36. Ordinarily, these signals would be provided directly to a cathode ray tube (CRT) 38 for display. In accordance with the teachings of the present invention, the video stored in each memory is sequentially applied to the CRT by the controller 28. The controller 28 simultaneously activates the corresponding liquid crystal switch 20, 22, or 24. The controller 28 thereby coordinates the input image to the light valve with the application of color. That is, when activated, the switches 20, 22 and 24 pass the incident S polarized light unchanged to a second blue filter 40, a second red filter 42 and a second green filter 44 respectively. The second blue filter 40 may be replaced with a broadband reflector without departing from the scope of the invention. The design constraints on the second red and green filters 42 and 44 differs from the design constraints on the first red and green filters 16 and 18. That is, the second red filter 42 must not only reflect red, but also efficiently transmit blue light. The designer would choose blue and red filters having suitable indices of reflection and transmission based on the applicable system requirements. Only the green filter 44 is nonstandard off-the-shelf design. Versions of this filter exist that are designed to operate at 0 degrees. The 0 degree filter may be purchased from OCLI (Optical Coating Laboratories Inc.) for example. One of ordinary skill in the art will recognize that to modify the 0 degree design to operate at the high 45 degrees angle would require a reoptimization of the 0 degree coating for a 45 degree angle of incidence. The alternative embodiment of FIG. 3 eliminates this design constraint on the green filter. Although the embodiment of FIG. 3 is functionally equivalent to that of FIG. 1, it offers improved system efficiency since both axes of polarization are used.

Figure 3:
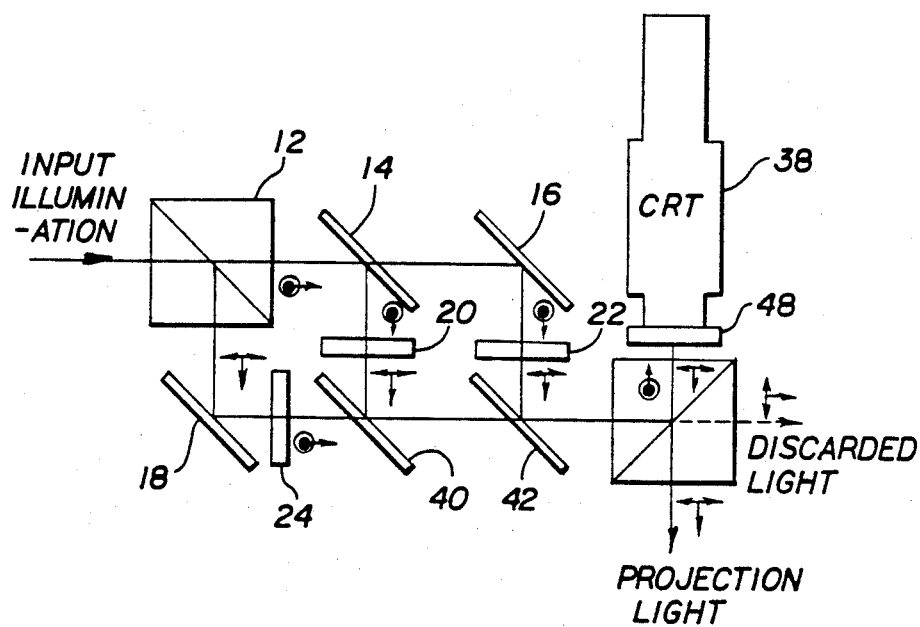
FIG. 3 is an optical layout of an alternative embodiment of a color sequential illumination system utilizing the teachings of the present invention.

As in FIG. 1, the prepolarizer 12 of the embodiment of FIG. 3 is a wide band MacNeille polarizing prism. Again the blue filters 14 and 40 reflect the blue and transmit the red and green wavelengths. Similarly, the ref filters 16 and 42 reflect the red and transmit the blue and green wavelengths. However, since, in this embodiment, the green filter 18 only reflects the green wavelengths, it may be replaced with a broadband reflector. That is, since light on this channel must pass though both the blue filter 40 and the red filter 42 only the green wavelengths will be in the beam at the green filter 18. Use of an off-the-shelf reflector instead of a green filter further reduces the system cost. It should be noted that in the layout of FIG. 3, the function of the green switch 24 is opposite to those in the blue and red channels. That is, the incident light is white and S polarized. When the switch 24 is off, the incident S polarized light is transmitted as white P polarized light through the switch 24 and the filters 40 and 42. In the process, as mentioned above, the blue and red wavelengths are removed by the blue and red filters 40 and 42 respectively such that only green S light reaches the main prism 46.

In the first embodiment, the switch that is "on" is in the channel in which light is directed to the light valve 48 by the main prism 46. In the second embodiment, switch 20 or 22 being off or switch 24 being on, selects the associated channel for input to the main prism 46. That is, when the first switch 20 is off blue P polarized light is switched to blue S and passed by the switch 20 to the blue filter or reflector 40. It is then reflected to the red filter 42 by which it is transmitted to the main polarizing MacNeille type prism 46 where it is reflected to the light valve 48. The blue video from the blue memory 36 is supplied to the CRT 38 by the controller 28. The presence of video on the CRT screen triggers the light valve 48 to reflect the incident S polarized light as P polarized light toward the main polarizer 46. The returning P polarized light passes through the main polarizer 46 to projection optics and display surface (not shown). While only one switch is on at a time, the other switches 22 and 24 are subsequently, similarly, sequentially activated by the controller 28 to display the colors at a rate fast enough that the colors appear fuse together to the viewer. This causes the viewer to see a composite full color image. For example, if a 30 Hz frame rate is required for a full color image, the required frame rate for each successive primary color is 90 Hz. With the time for each a complete frame being 33 msec, the time available for each each primary colored frame is approximately 11 msec with a wait of 22 msec before the same color is displayed. If an interlaced display is required then the scan rate for each primary colored field is 180 Hz and the display time is 5.5 msec per field. These display times are only approximate, since the vertical retrace time must be subtracted from the available time to display the video information.

Thus, the invention has been described with reference to illustrative embodiments for a particular application. Those having ordinary skill in the art will recognize additional modifications applications and embodiments within the scope thereof. For example, the invention is not limited to any particular means for prepolarizing the input illumination. Further, the invention is not limited to any particular optical layout. For instance, switch 24 may be located in front of the filter 18. Nor is the invention limited to the number of optical switches and while an illustrative control system is disclosed herein, it is understood that other control systems may be employed as is known in the art. The invention is not limited to use with liquid crystal light valves. The teachings provided herein may be used in any application where a benefit may be derived by sequential application of beams of light to a surface. In addition, the present invention is not limited to optical applications. Those of ordinary skill in the art will recognize that the teachings of the present invention may apply to other forms of electromagnetic energy.

It is therefore intended by the appended claims to cover any and all such modifications, applications, and embodiments. Thus,

What is claimed is:

1. A color sequential system for illuminating a liquid crystal light valve with a first beam having a first color and a first polarization state and second beam having a second color and said first polarization state, said system comprising:
   first means for providing a first beam along a first optical path having a first color and said first polarization state;
   second means for providing a second beam along a second optical path having a second color and said first polarization state;
   optical switch means for selectively transmitting said first and second beams by changing the polarization state thereof;
   third means for directing said first beam onto said liquid crystal light valve and
   fourth means for directing said second beam onto said liquid crystal light valve.

2. The color sequential system of claim 1 wherein said optical switch means includes first and second polarization switches.

3. The color sequential system of claim 2 including control means for selectively and sequentially activating said first and second polarization switches.

4. The color sequential system of claim 3 wherein said first and second means includes a prepolarizer.

5. The color sequential system of claim 4 wherein said first means further includes a first color filter.

6. The color sequential system of claim 5 wherein said second means includes a second color filter.

7. The color sequential system of claim 5 wherein said second means includes a reflector.

8. The color sequential system of claim 3 wherein said third means includes a third color filter.

9. The color sequential system of claim 3 wherein said third means includes a reflector.

10. The color sequential system of claim 3 wherein said fourth means includes a fourth color filter.

11. A color sequential system for illuminating a full color liquid crystal light valve with a first beam having a first color and a first polarization state and second beam having a second color and said first polarization state, said system comprising:
   first means for providing a first beam along a first optical path;
   second means for providing a second beam along a second optical path;
   first and second polarization switch means for selectively and sequentially transmitting said first and second beams respectively;
   control means for selectively and sequentially activating said first and second polarization switch means;
   third means for directing said first beam onto said liquid crystal light valve and
   fourth means for directing said second beam onto said liquid crystal light valve.

12. The color sequential system of claim 11 wherein said first and second means includes a prepolarizer.

13. The color sequential system of claim 12 wherein said first means further includes a first color filter.

14. The color sequential system of claim 13 wherein said second means includes a second color filter.

15. The color sequential system of claim 13 wherein said second means includes a reflector.

16. The color sequential system of claim 11 wherein said third means includes a third color filter.

17. The color sequential system of claim 11 wherein said third means includes a reflector.

18. The color sequential system of claim 11 wherein said fourth means includes a fourth color filter.

19. The color sequential system of claim 11 wherein said polarization switches provide means for selectively changing the polarization state of said first and second beams.

20. A color sequential method for illuminating a full color liquid crystal light valve with a first beam having a first color and a first polarization state and second beam having a second color and said first polarization state, said method including the steps of:
   (a) providing a first beam along a first optical path;
   (b) providing a second beam along a second optical path;
   (c) selectively and sequentially changing the polarization state of said first and second beams;
   (d) directing said first beam onto said liquid crystal light valve and
   (e) directing said second beam onto said liquid crystal light valve

* * * * *